(12) United States Patent
Mekala et al.

(10) Patent No.: US 7,729,332 B2
(45) Date of Patent: Jun. 1, 2010

(54) TECHNIQUE FOR TRANSFERRING DATA FROM A TIME DIVISION MULTIPLEXING NETWORK ONTO A PACKET NETWORK

(75) Inventors: Anantha R. Mekala, Leominster, MA (US); Mehryar K. Garakani, Westlake Village, CA (US)

(73) Assignee: Cisco Technology, Inc., San Jose, CA (US)

( * ) Notice: Subject to any disclaimer, the term of this patent is extended or adjusted under 35 U.S.C. 154(b) by 1129 days.

(21) Appl. No.: 11/184,483

(22) Filed: Jul. 19, 2005

(65) Prior Publication Data

US 2007/0019581 A1 Jan. 25, 2007

(51) Int. Cl.
*H04B 7/212* (2006.01)
(52) U.S. Cl. ........................ 370/347; 370/474
(58) Field of Classification Search ................ 370/347
See application file for complete search history.

(56) References Cited

U.S. PATENT DOCUMENTS

| | | | |
|---|---|---|---|
| 5,218,680 A * | 6/1993 | Farrell et al. ............... | 709/215 |
| 5,448,560 A | 9/1995 | Chen et al. | |
| 5,799,017 A | 8/1998 | Gupta et al. | |
| 6,658,026 B1 | 12/2003 | Birkeland | |
| 6,667,972 B1 * | 12/2003 | Foltan et al. ............... | 370/354 |
| 6,724,780 B1 * | 4/2004 | Bhuyan et al. ............. | 370/523 |
| 6,728,238 B1 * | 4/2004 | Long et al. ................. | 370/352 |
| 6,765,926 B1 | 7/2004 | Price et al. | |
| 6,804,776 B1 | 10/2004 | Lothberg et al. | |
| 6,865,150 B1 | 3/2005 | Perkins et al. | |
| 6,876,678 B1 | 4/2005 | Chow et al. | |
| 6,888,808 B2 | 5/2005 | Jagadeesan et al. | |
| 6,907,003 B1 * | 6/2005 | Gvozdanovic ............. | 370/232 |
| 2002/0110120 A1 * | 8/2002 | Hagglund et al. .......... | 370/389 |
| 2006/0115088 A1 * | 6/2006 | Valentine et al. ........... | 380/270 |

OTHER PUBLICATIONS

"Cisco-Troubleshoot V.110 Connections on Cisco Access Servers," Document ID: 24675, Cisco Systems, Inc., © 1992-2004, pp. 1-7.

* cited by examiner

*Primary Examiner*—Charles N Appiah
*Assistant Examiner*—Jaime M Holliday
(74) *Attorney, Agent, or Firm*—Hamilton, Brook, Smith & Reynolds, P.C.

(57) ABSTRACT

A technique for processing data carried by a Time Division Multiplexing (TDM) channel in a TDM network. A data stream associated with a TDM channel is monitored to determine if it contains data frames. If so, the channel associated with the data stream enters a clear channel mode which causes data in the data stream to be placed in packets for transfer over the packet network without being modified. Provided the data stream continues to carry data frames, the data stream stays in clear channel mode. After the data stream data no longer carries data frames, the channel exits clear channel mode.

15 Claims, 10 Drawing Sheets

|     | 310a | 310b | 310c | 310d | 310e | 310f | 310g | 310h |      |
| --- | --- | --- | --- | --- | --- | --- | --- | --- | --- |
|     | 0 | 0 | 0 | 0 | 0 | 0 | 0 | 0 | 320a |
|     | 1 | D1 | D2 | D3 | D4 | D5 | D6 | S1 | 320b |
|     | 1 | D7 | D8 | D9 | D10 | D11 | D12 | X1 | 320c |
|     | 1 | D13 | D14 | D15 | D16 | D17 | D18 | S3 | 320d |
|     | 1 | D19 | D20 | D21 | D22 | D23 | D24 | S4 | 320e |
|     | 1 | E1 | E2 | E3 | E4 | E5 | E6 | E7 | 320f |
|     | 1 | D25 | D26 | D27 | D28 | D29 | D30 | S6 | 320g |
|     | 1 | D31 | D32 | D33 | D34 | D35 | D36 | X2 | 320h |
|     | 1 | D37 | D38 | D39 | D40 | D41 | D42 | S8 | 320i |
|     | 1 | D43 | D44 | D45 | D46 | D47 | D48 | S9 | 320j |

FIG. 3

400
TECHNIQUE FOR TRANSFERRING DATA FROM A TIME DIVISION MULTIPLEXING NETWORK ONTO A PACKET NETWORK

FIELD OF THE INVENTION

This invention relates to data networks and in particular to transferring data from a Time Division Multiplexing (TDM) network onto a packet network.

BACKGROUND OF THE INVENTION

For many years it was quite common for service providers to utilize Time Division Multiplexing (TDM) switches to carry information, such as voice signals, across TDM-based data networks. In a typical TDM network arrangement, a TDM switch in the network converts voice signals from a telephone at a source end of a conversation into digitized voice information and places the digitized voice information into one or more TDM frames. The TDM frames are carried through the TDM network via a series of TDM switches to a destination endpoint. At the destination endpoint, a TDM switch extracts the digitized voice information from the TDM frames and converts it back to voice signals which are played on a telephone at the destination end of the conversation.

Nowadays, packet-based data networks are increasingly being employed to transport information contained in TDM frames over portions of TDM networks. The attractiveness of packet networks relates to their lower cost as well as their versatility. For example, with regards to versatility, many packet networks support the Internet Protocol (IP) which enables a number of other protocols, such as Voice over IP (VoIP) to be utilized on these networks. Further, IP is a base protocol that is used to communicate information across the Internet, thus packet networks open the possibility of using the Internet as a medium for transporting information normally carried by TDM networks.

Since many current-day communications networks operated by service providers have been built using TDM equipment, often service providers limit their deployment of packet networks within their TDM networks where it makes economic sense to do so. For example, a service provider may limit replacing portions of its TDM network containing fully depreciated TDM equipment with a packet network.

Because the format of TDM frames carried in the TDM network often differ from the format of packets carried in a packet network, gateway devices are often employed to "translate" between the TDM frames and the packets. Here, TDM frames are forwarded to a gateway device which reformats information contained in the frames, such as digitized voice information, into packets. These packets are then carried by packet switches in the packet network to another gateway device which reformats the information contained in the packets into one or more TDM frames, and transfers the frames over the TDM network.

The gateway devices may also be configured to further process the information contained in the TDM frames in an attempt to attain better bandwidth efficiency as well as enhance performance. For example, the gateway device may employ coder/decoders (CODECs) to perform various functions, such as detect voice activity-inactivity, remove silence, compress voice signals and process voice signals to cancel echo. Bandwidth efficiency may be attained by these functions as they tend to reduce the amount of information that is transported across the network.

One problem with processing information using CODECs, is that while being suitable for handling voice information, these techniques may not be suitable for handling data information, such as Short Message Service (SMS) text messages or data files. For example, a CODEC may remove silence from voice information contained in TDM frames by looking for a certain patterns in the voice information and if the pattern is found, dropping the voice information. While this may not be an issue for digitized voice as dropping small portions of a digitized voice signal may not be discernable to the human ear; this may be an issue for data information. For example, if the data information contains important transaction information, such as a bank transaction, dropping portions of the data may corrupt the transaction which could have drastic consequences.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 illustrates a data frame for holding data information that may be used with the present invention.

DETAILED DESCRIPTION OF THE INVENTION

A description of preferred embodiments of the invention follows.

The following preferred embodiments of the invention describe the invention as used with data frames that conform to the International Telecommunication Union Telecommunication Standardization Sector (ITU-T) V.110 standard and Time Division Multiplexing (TDM) frames that conform to the ITU-T E1 standard both of which are available from the ITU, Geneva, Switzerland. However, it should be understood that the inventive technique may be adapted to work with other standard and non-standard communication protocols.

Figure 1:
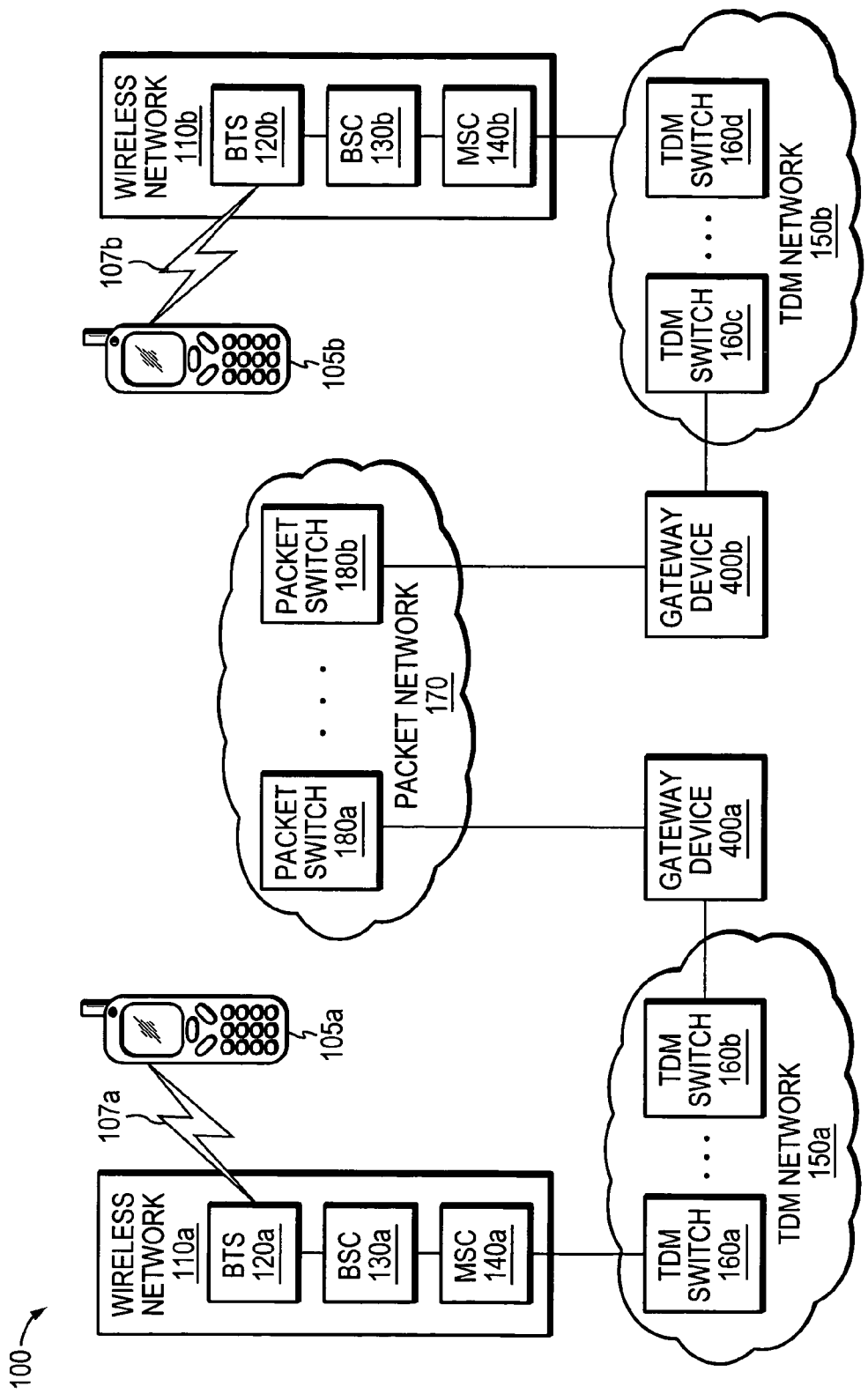
FIG. 1 is a high-level block diagram of a data network that may implement the present invention.

FIG. 1 is a high-level block diagram of an exemplary communication network 100 that may be used to implement the present invention. Network 100 comprises wireless communication units 105, a wireless network 110, a TDM network 150, gateway devices 400 and a packet network 170. The wireless communication units 105 are conventional wireless communication units, such as cell-phones, capable of exchanging information (e.g., voice and data) via wireless links 107 with other entities in the network 100.

The wireless network 110 is preferably a conventional GSM network having Base Station Transceivers (BTSs) 120, Base Station Controllers (BSCs) 130 and Mobile Switching Centers (MSCs) 140. The BTSs 120 enable wireless signals to be transmitted and received between the communication units 105 and the wireless network 110 via various radio channels. The BSCs 130 perform various control functions such as handling allocation of radio channels, receiving measurements from the communication units 105, controlling handovers of the communication units 105 from BTS to BTS and the like. The MSCs 140 provide circuit-switched calling, mobility management and various GSM services to communication units 105 that are roaming within an area that the MSCs 140 serve. These services may include voice, data services, fax services and call divert. The data services may include Short Message Service (SMS), data file transfer services and various access services that enable data to be transferred between the communication units 105 and data networks, such as the Internet. The data may include data associated with computer files, text messages, computer transactions (e.g., bank transactions, stock transactions, database transactions), digital encoded music, digitized images, computer applications (e.g., data such as web pages used by web browsers) and so on.

The packet network 170 is a conventional data network, such as an Internet Protocol (IP) network, an Ethernet network, an Asynchronous Transfer Mode (ATM) network or a Frame Relay (FR) network, which is configured to carry information between TDM switches 160 using data packets. The packet network 170 comprises one or more packet switches 180 which are configured to carry the data packets through the network 170 using various protocols, such as the well-known ATM protocol and the IP protocol.

The TDM network 150 comprises a plurality of TDM switches 160 which are configured to transfer information, such as voice and data information, across the TDM network 150 using TDM frames. An example of a TDM frame that may be used with present invention is the E1 carrier format frames. E1 carrier format frames are defined in the ITU-T G.704 standard which is available from the ITU. It should be noted that other framing protocols, such as T1, T3, DS1, DS3 and the High Level Data Link Control (HDLC) protocols, may be employed to carry information over the TDM network 150.

Figure 2:
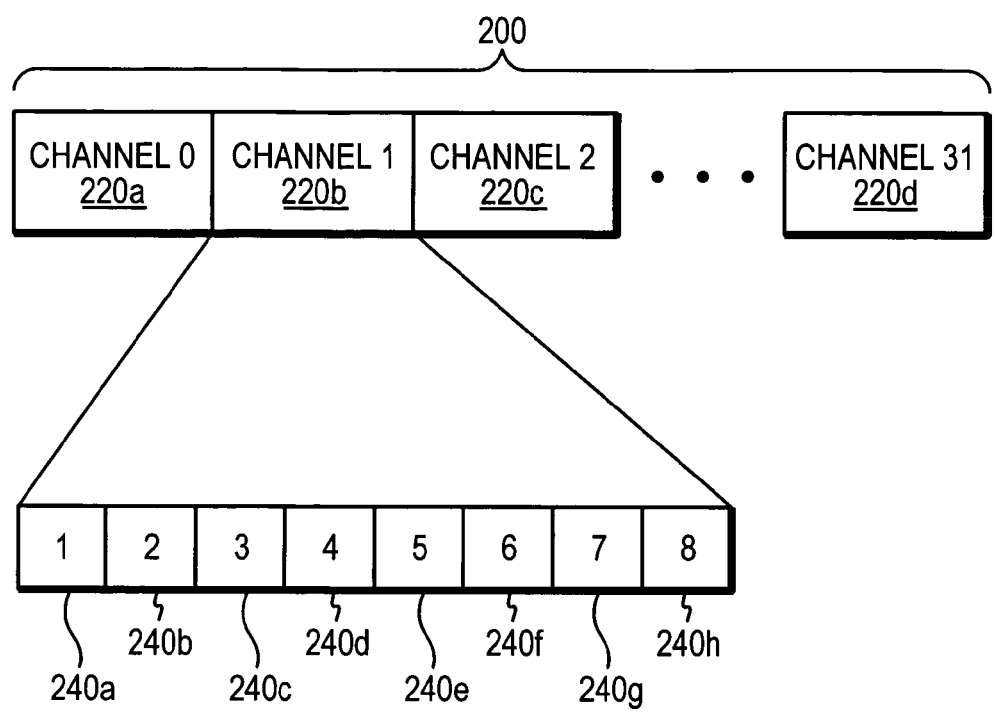
FIG. 2 is illustrates a Time Division Multiplexing (TDM) frame that may be used with the present invention.

FIG. 2 illustrates an exemplary TDM frame 200 that may be used with the present invention. Frame 200 is illustratively an E1 carrier format frame comprising 32 channels (time slots) wherein each channel 220 carries eight bits 240*a-h* of information per frame 200 and is used to convey certain types of information across the TDM network. For example, in a typical E1 frame, channels 1-15 and 17-31 are used to carry voice and/or data information, channel 16 is used to carry signaling information, and channel 0 is used to carry synchronization information.

As used herein, data information refers to information that is related to data as opposed to information that is, e.g., related to voice, such as digitized voice. Data information includes but is not limited to data files, data transactions (e.g., bank transactions, stock transactions, shopping transactions), web pages, video images, video games, ring tones, electronic mail (e-mail), messaging services and the like.

In accordance with an aspect of the present invention, data information is encapsulated in data frames. FIG. 3 is an illustration of a data frame 300 that may be used with the present invention. Data frame 300 is a conventional fixed-sized 80-bit V.110 frame. V.110 frames are defined in the ITU-T V.110 recommended standard available from the ITU. Data frame 300 is illustrated as having ten rows 320 and eight columns 310. Each row 320 represents a byte (octet) of information contained in the data frame 300. Each column 310 represents a bit position within the octets.

In data frame 300, bits D1-D48 carry data information, bits E1-E7 carry information associated with the data frame, such as the transmission speed at which the data frame is sent, and bits S1-S9 and X1-X2 carry synchronization information. Row 320*a* and bit position 310*a* in rows 320*b-j* hold a fixed pattern that indicates a V.110 frame. Specifically, row 320*a* contains a fixed 8-bit pattern of all zeros and bit position 310*a* of rows 320*b-j* holds a fixed pattern of all ones. The combination of the patterns in row 320*a* and bit position 310*a* of rows 320*b-j* may be used to detect valid V.110 frames. A "start of a V.110 frame" is indicated by the eight bits in row 320*a* and the one bit 310*a* of row 320*b*.

The gateway devices 400 are coupled to the packet network 170 and the TDM network 150, and provide, inter alia, conventional gateway services that enable information to be transferred between the TDM network 150 and the packet network 170. These services include translating between E1 frames 200 carried by the TDM network 150 and packets carried by the packet network 170 in accordance with an aspect of the present invention.

Figure 4:
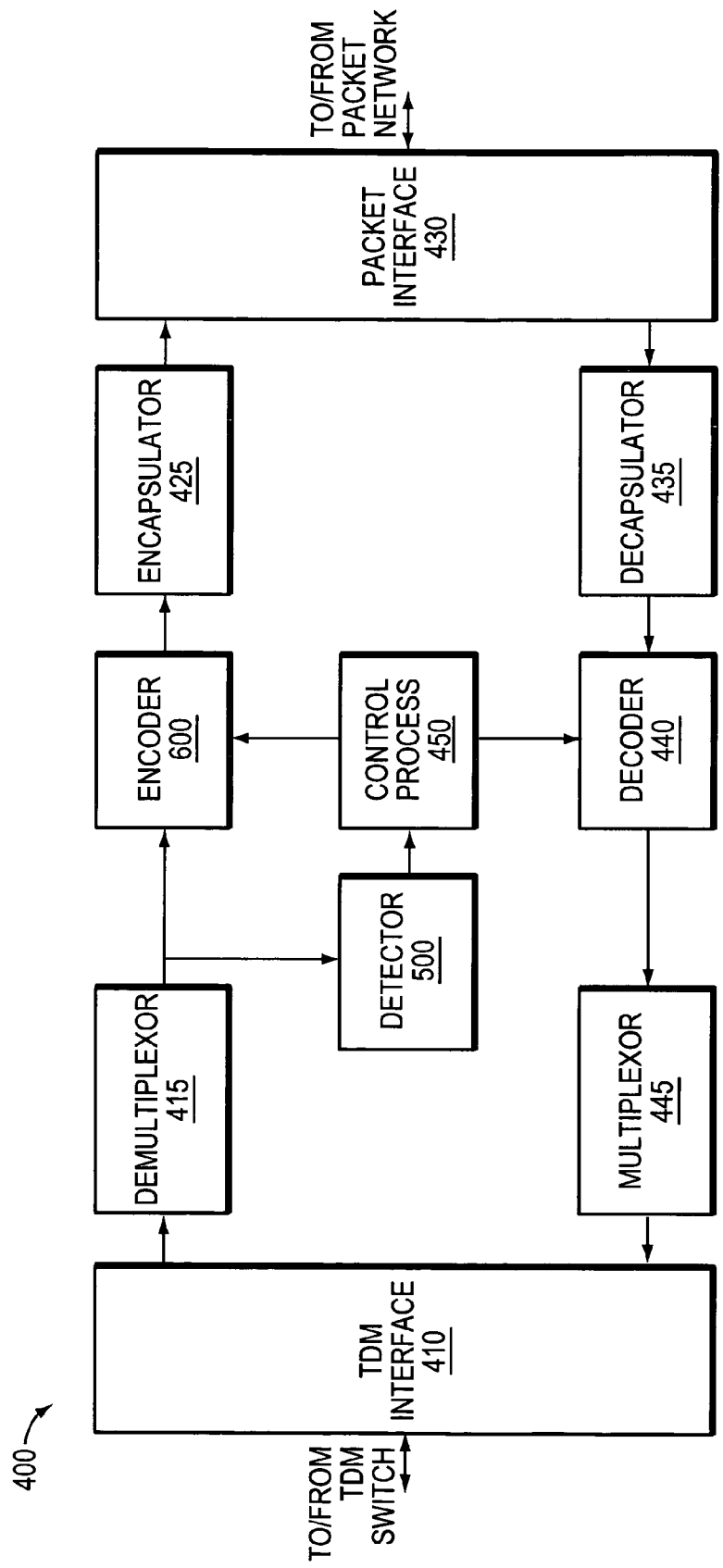
FIG. 4 is a high-level partial block diagram of a gateway device that may be used with the present invention.

FIG. 4 is a high-level partial block diagram of a gateway device 400 that may be used with the present invention. Gateway 400 comprises various functional components including a TDM interface 410, a demultiplexor 415, a detector 500, a control process 450, an encoder 600, an encapsulator 425, a packet interface 430, a decapsulator 435, a decoder 440 and a multiplexor 445. A suitable gateway device that may be used with the present invention is the Cisco MGX 8880 media gateway switch available from Cisco Systems Inc., San Jose, Calif. 95134.

The TDM interface 410 and packet interface 430 interface the gateway 400 with the TDM network 150 and the packet network 170, respectively, and enable the gateway 400 to transfer information between those networks 150, 170 and the gateway 400 using various protocols, such as ATM, frame relay and Ethernet. To that end, the interfaces 410, 430 illustratively comprise conventional interface circuitry that incorporates signal, electrical and mechanical characteristics, and interchange circuits, needed to interface with the physical media of the networks 150, 170 and protocols running over that media.

The demultiplexor 415 "demultiplexes" data carried by channels of TDM frames 200 received by the TDM interface 410 into a series of 32 data streams wherein each data stream corresponds to a particular channel in the TDM frames. The demultiplexed data streams are fed to the detector 500 which determines if the demultiplexed data streams contain data. Specifically, the detector 500 examines the data in the data streams and determines if the data streams contain V.110 frames. If a channel's data stream contains V.110 frames, the channel is assumed to be carrying data and the detector notifies the control process 450 which configures the encoder 600 and decoder 440 to enter clear channel mode for that channel. Data passed to the encoder 600 for a channel that is in clear channel mode is passed through the encoder 600 to the encapsulator 425 as unmodified data.

The encapsulator 425 encapsulates data transferred from the encoder 600 by placing the data in packets (e.g., ATM packets). The packets are transferred to the packet interface 430 which transfers the packets onto the packet network 170. The packet interface 430 also receives packets from the packet network 170 and transfers the packets to the decapsulator 435 which extracts data from the packets and places the data onto one of 32 data streams (one for each channel) depending on the channel associated with the data.

The data streams are fed to the decoder 440 which "decodes" (e.g., decompresses) encoded data associated with a stream data and passes data that is not encoded through the decoder 440 as unmodified data. The data stream data is transferred to the multiplexor 445 which "multiplexes" the data from the data streams onto various TDM frames and transfers the TDM frames to the TDM interface 410. The TDM interface transfers the TDM frames onto the TDM network 150.

It should be noted that functions performed by the gateway 400, including functions that implement aspects of the present invention, may be implemented using some combination of hardware and/or software. It should be further noted that computer-executable instructions and/or computer data that implement aspects of the present invention may be stored in a computer-readable medium, such as volatile memories, non-volatile memories, removable disks and non-removable disks. In addition, it should be noted that various electromagnetic signals, such as wireless signals, electrical signals carried over a wire, optical signals carried over optical fiber and the like, may be encoded to carry computer-executable instructions and/or computer data that implement aspects of the present invention on a data network.

The present invention relates to a technique for transferring data carried by a TDM channel in a TDM based data network onto a packet network. According to an aspect of the present invention, information carried by a TDM channel is monitored to determine if it contains data frames (e.g., a V.110 data frames). If so, the TDM channel is placed in a clear channel mode which causes data frames carried by the TDM channel to be placed in packets as unmodified data for transfer over a packet network. Unmodified data refers to data frames that have not been modified (e.g., encoded using a coder/decoder (CODEC)) before the data frames are placed in the packet. Provided the TDM channel continues to carry data frames, the channel stays in clear channel mode. After it is detected that the TDM channel no longer carries data frames, the TDM channel exits the clear channel mode.

Advantageously, by providing a clear channel mode to pass the data from TDM frames to packets as unmodified data, the present invention obviates the effects on the data (e.g., loss of data) that may occur with prior art systems that modify (e.g., encode) the data.

In accordance with an aspect of the present invention, the detector 500 detects whether a channel is carrying data frames by detecting V.110 frames 300 carried in the data stream associated with the channel that is transferred to the detector from the demultiplexor 415. If the data stream is carrying V.110 frames 300, the detector 500 assumes the channel is carrying data frames and notifies the control process 450 to place the channel associated with the data stream in clear channel mode. The control process 450 places the channel in clear channel mode by configuring the encoder 600 and decoder 440 to "pass through" the data frames for that channel.

Figure 5:
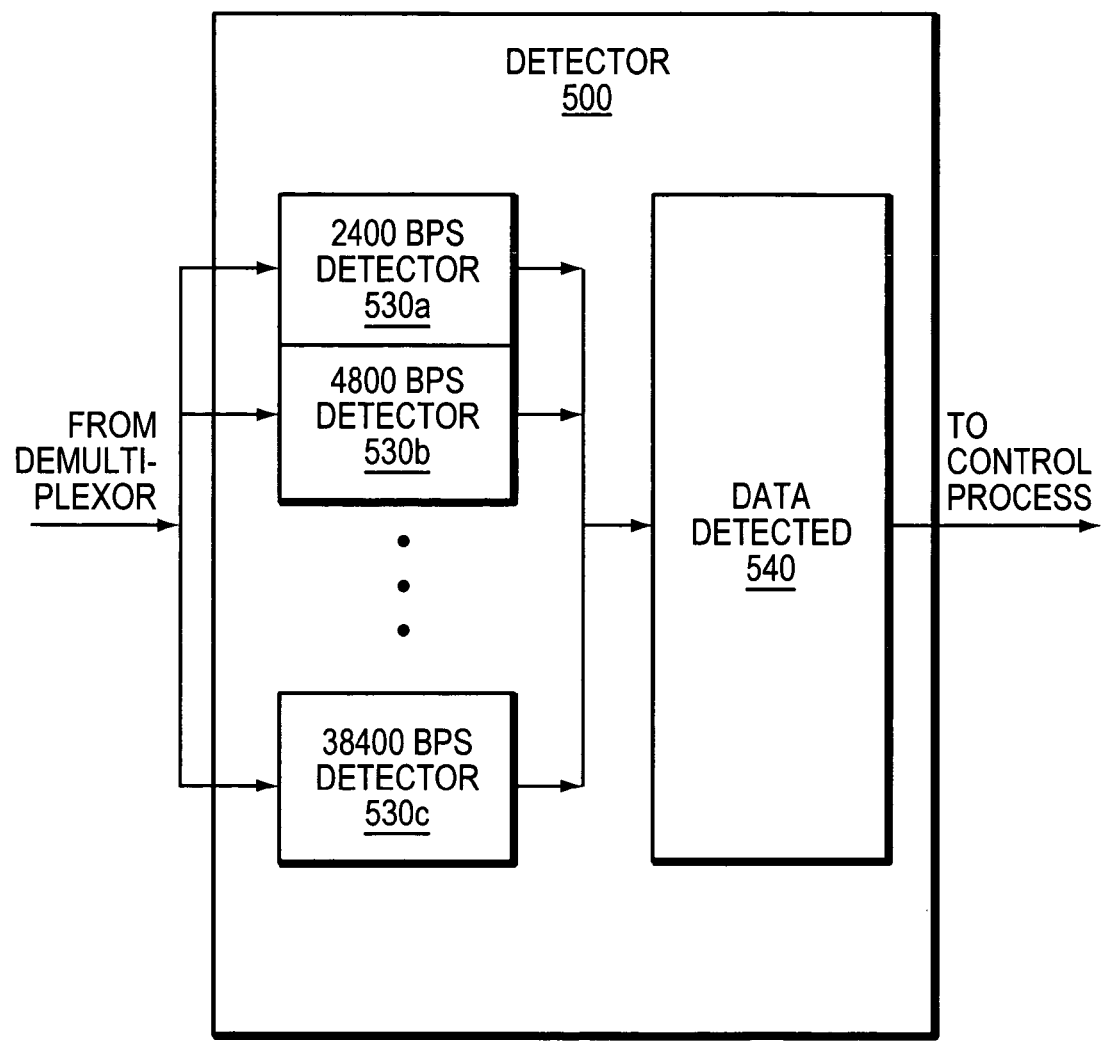
FIG. 5 is a high-level partial block diagram of an encoder and a decoder that may be used with the present invention.

FIG. 5 is a high-level block diagram of a detector 500 that may be used with the present invention. Detector 500 comprises one or more frame detectors 530 and a data frame detected function 540. Each frame detector 530 is configured to detect V.110 frames 300 that arrive on a particular data stream at a given speed. For example, frame detector 530*a* is configured to detect V.110 frames 300 that arrive on the data stream at a speed of 2400 bits-per-second (bps). Likewise, frame detectors 530*b* and 530*c* are configured to detect V.110 frames 300 that arrive on the data stream at a speed of 4800 bps and 38,400 bps, respectively.

In practice, V.110 frames 300 are typically sent at a particular speed. Thus, for example, for any given channel, V.110 frames 300 are sent at a particular speed and only one of the frame detectors 530 will detect the V.110 frames 300, i.e., the frame detector 530 that is configured to detect frames 300 at the particular speed the data frames 300 are being sent. For example, assume a data stream is carrying V.110 frames 300 that are coded for transfer at a speed of 2400 bps. The data stream is fed to the detector 500 and the 2400 bps frame detector 530*a* detects that the data stream contains V.110 frames 300.

If a V.110 frame 300 is detected by a frame detector 530, the frame detector 530 notifies the data frame detected function 540. In response to the notification, the data frame detected function 540 determines if the control process 450 should be notified to configure the encoder 600 to place the channel associated with the data stream in clear channel mode. Specifically, function 540 illustratively determines if a predetermined number ("N") of continuous V.110 frames 300 have been detected by a particular frame detector 530 for a particular data stream. If so, the data detected function 540 notifies the control process of this condition and the control process 450 configures the encoder 600 and decoder 440 to place the channel associated with the data stream in clear channel mode.

Likewise, if a predetermined number of continuous V.110 frames 300 have not been detected by any frame detector 530 in a data stream associated with a particular channel that is in clear channel mode, the data detected function 540 notifies the control process 450 of this condition and the control process 450 configures the encoder 600 and decoder 440 to exit the channel associated with the data stream from clear channel mode.

Figure 6:
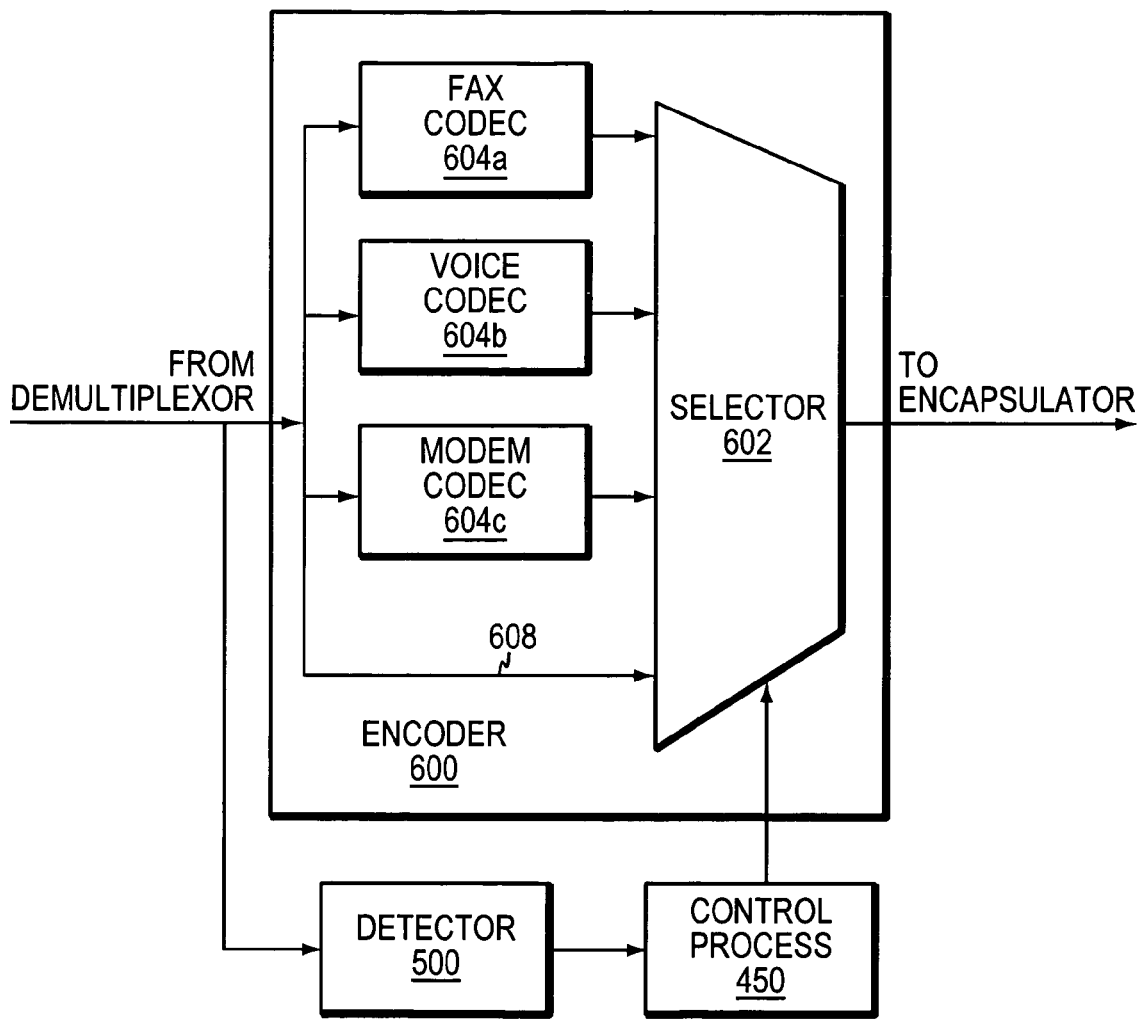
FIG. 6 is a high-level block diagram of a data frame detector that may be used with the present invention.

FIG. 6 is a high-level block diagram of an encoder 600 that may be used with the present invention. Encoder 600 comprises a selector 602 and one or more CODECs 604. The selector 602 is configured by the control process 450 to select whether data associated with a data stream that are received by the encoder 600 are passed through the encoder 600 via path 608 or passed to one of the CODECs 604 to be modified before being transferred to the encapsulator 425. Data associated with a data stream that is not in clear channel mode are passed to a CODEC 604 which modifies (e.g., compresses) the data before it is transferred to the encapsulator 425. Data associated with a data stream that is in clear channel mode are passed through the encoder 600 to the encapsulator 425 via path 608 without being modified.

It should be noted that the above-described functions for the detector 500 and encoder 600 may be replicated for each TDM channel processed by the gateway 300. For example, the frame detector 530 and data detected 540 functions may be replicated for each data stream processed by the detector 500. Likewise, the selector 602, CODEC 604 and pass through path 608 functions of the encoder 600 may all be replicated for each data stream handled by the encoder 600.

Figure 7A:
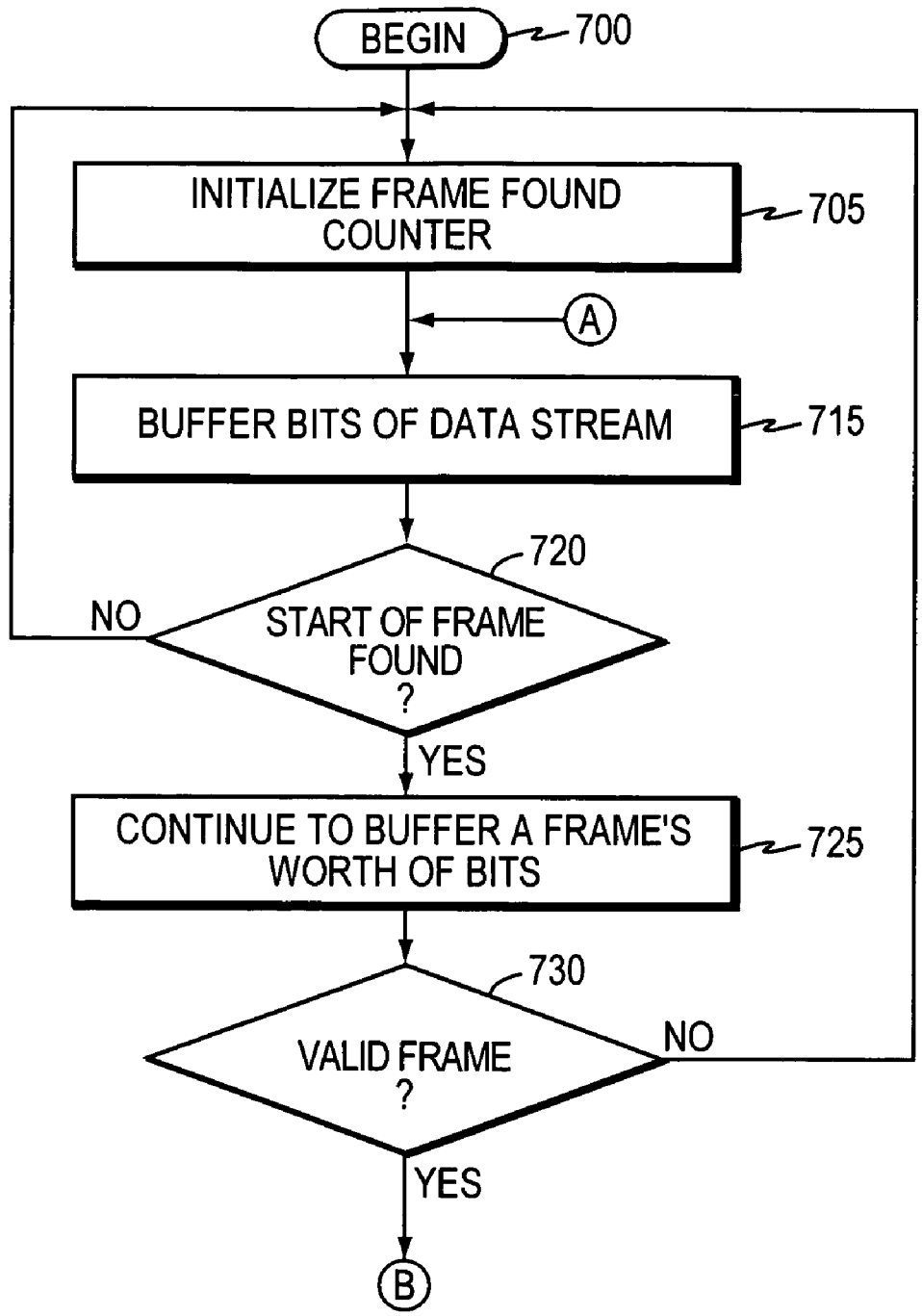
FIGS. 7A-B are a flow chart of a sequence of steps that may be used to place a channel into clear channel mode in accordance with an aspect of the present invention.
Figure 7B:
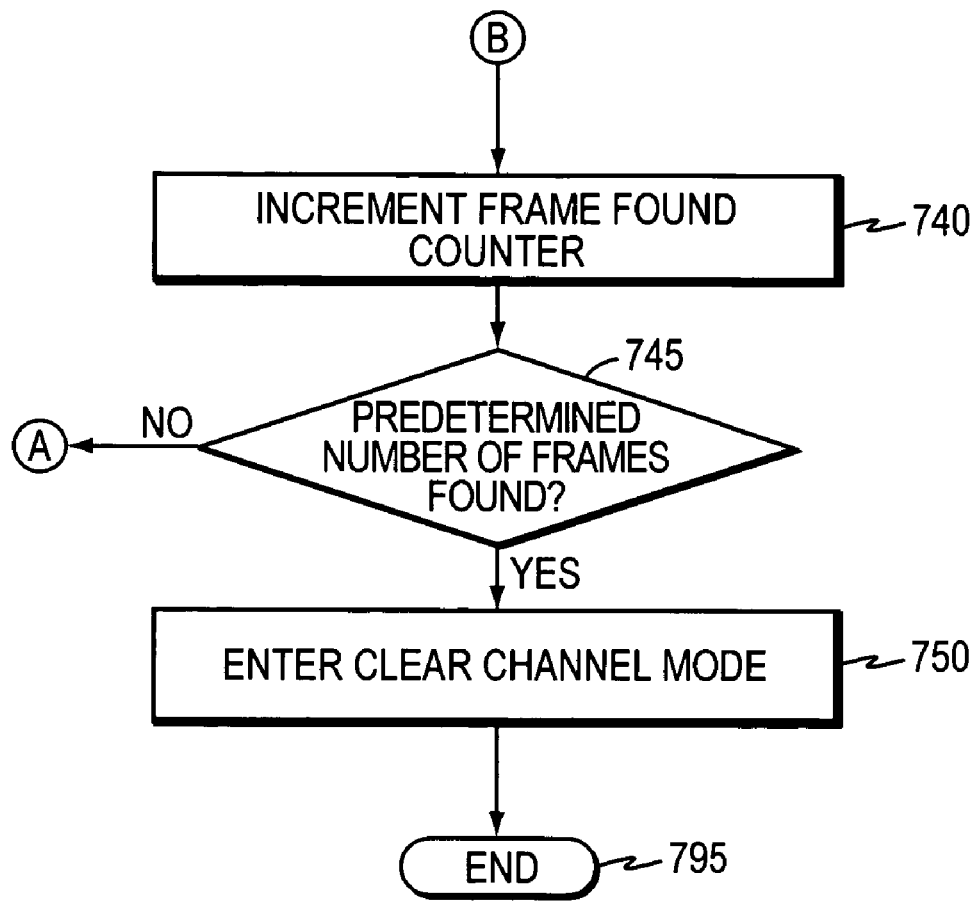

As noted above, the detector 500 detects V.110 frames 300 carried by data streams fed to the detector 500 and notifies the control process 450 to place channels associated with the data streams containing V.110 frames 300 in clear channel mode. FIGS. 7A-B are a flow chart of a sequence of steps that may be used to configure detector 500 to detect V.110 frames 300 in a data stream and, if the data stream contains V.110 frames 300, notify the control process 450 to configure the encoder

600 to place the channel associated with the data stream in clear channel mode in accordance with an aspect of the present invention.

The sequence begins at step 700 and proceeds to step 705 where a frame found counter is initialized to e.g., zero. Next, at step 715, eight bits of data from a data stream is buffered. A check is performed at step 720 to determine if the buffered bits contain a "start of a V.110 frame" data pattern, as described above. If a "start of a V.110 frame" data pattern is not found, the sequence returns to step 705. Otherwise, the sequence proceeds to step 725 where a V.110 frame's worth of bits (e.g., 80 bits) are buffered.

At step 730, a check is performed to determine if the buffered bits indicate a valid V.110 frame. Specifically, the buffered bits are checked to determine if they contain the fixed pattern indicated in row 320a and column 310a of a V.110 frame 300, as described above. If not, the sequence returns to step 705. Otherwise, the sequence proceeds to step 740 (FIG. 7B) where the frame found counter is incremented. Next, at step 745, a check is performed to determine if the frame found counter indicates that a predetermined number of V.110 frames 300 have been found. Illustratively, the predetermined number of frames indicates a predetermined number of consecutive V.110 frames. This step is performed to avoid detecting false positives with regards to finding frames 300 in the data stream data. Preferably, the predetermined number of consecutive frames 300 is four. We have found that decreasing this number tends to increase the probability of false positives. In addition, increasing this number tends increase the amount of time it takes to enter clear channel mode without significantly decreasing the probability of false positives.

If the predetermined number of V.110 frames 300 has not been found, the sequence returns to step 705. Otherwise, the sequence proceeds to step 750 where the channel associated with the data stream enters clear channel mode and data on that data stream is passed through the encoder 600, as described above. The sequence ends at step 795.

After a particular channel enters clear channel mode, data associated with the channel's data stream are monitored by the detector 500 to determine if it continues to carry V.110 frames 300. If not, clear channel mode is exited for that channel. We have found that using a "leaky bucket" approach for determining when a channel should exit clear channel mode has been effective in avoiding false negatives which may cause the channel to exit clear channel mode prematurely due to e.g., corrupted data in the channel's data stream. It should be noted, however, that other approaches may be used.

Figure 8:
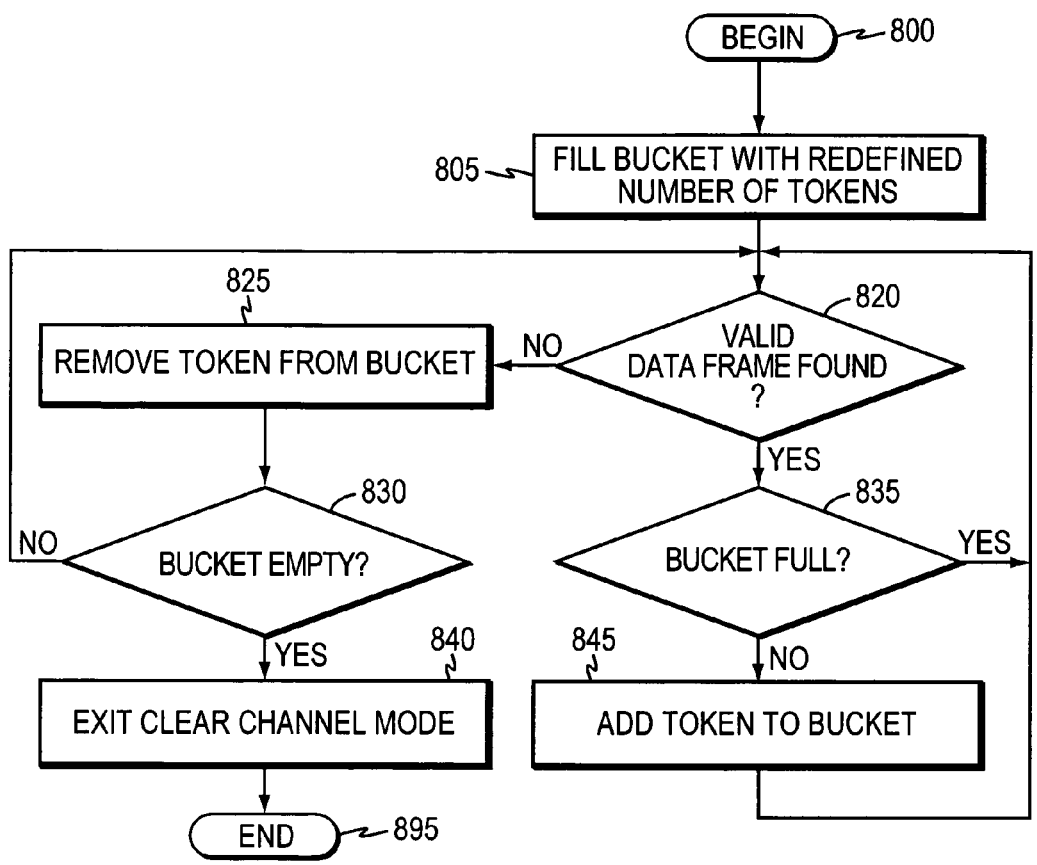
FIG. 8 is a flow chart of a sequence of steps that may be used to exit a channel from clear channel mode in accordance with an aspect of the present invention.

FIG. 8 is a flow chart of a sequence of steps for determining when a channel exits clear channel mode in accordance with an aspect of the present invention. The sequence begins at step 800 and proceeds to step 805 where a "bucket" that is configured to hold tokens and is associated with the channel is filled with a predefined number of tokens, preferably just after the channel enters clear channel mode. At step 820, the channel's data stream is monitored to determine if it is carrying valid V.110 frames 300. If a V.110 frame 300 is found, the sequence proceeds to step 835 where a check is performed to determine if the bucket is full. If so, the sequence returns to step 820. Otherwise, a token is added to the bucket (step 845) and the sequence returns to step 820.

If at step 820 it is determined that the data stream is not carrying valid V.110 frames, the sequence proceeds to step 825 where a token is removed from the bucket. The sequence then proceeds to step 830 where a check is performed to determine if the bucket is empty. If not, the sequence returns to step 820. Otherwise, the sequence proceeds to step 840 where clear channel mode for the channel associated with the data stream is exited. The sequence ends at step 895.

As noted above, in accordance with an aspect of the present invention, TDM frames received by a gateway 400 are demultiplexed into a series of data streams wherein each data stream is associated with a channel contained in the TDM frames. Each data stream is fed to the detector 500 which determines if the data stream contains V.110 frames 300. If so, the channel associated with the data stream enters clear channel mode and the data carried in the data stream are passed through the encoder 600 without modification to the encapsulator 425 where the data are placed into packets for transfer onto a packet network 170. Otherwise, if the data stream does not contain V.110 frames, data carried in the data stream are encoded (modified) by e.g., a CODEC 604 before being transferred to the encapsulator 425.

Figure 9:
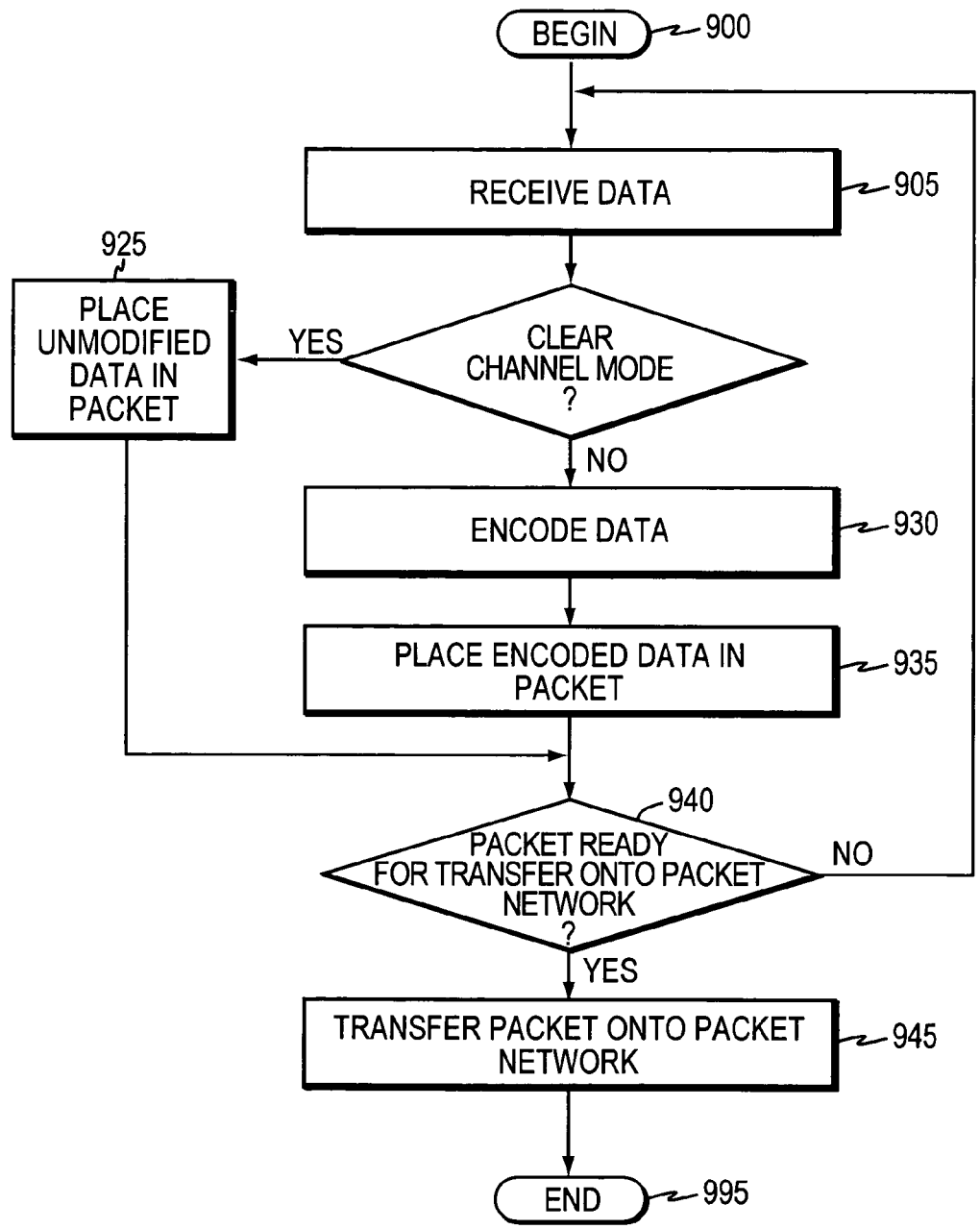
FIG. 9 is a flow chart of a sequence of steps that may be used to process data carried by a data stream associated with a channel in accordance with an aspect of the present invention.

FIG. 9 is a flow chart of a sequence of steps that may be used to configure a gateway 400 to process data carried in a data stream associated with a channel in accordance with an aspect of the present invention. The sequence begins at step 900 and proceeds to step 905 where data carried in the data stream are received from the demultiplexor 415. At step 920, a check is performed to determine if the channel associated with the data stream is in clear channel mode. If so, data from the data stream are passed unmodified through the encoder 600 to the encapsulator 425 where the data are placed in the packet as unmodified data (step 925) and the sequence proceeds to step 940. Otherwise, the sequence proceeds to step 930 where data from the data stream are modified (e.g., encoded) and the modified data are placed into the packet (step 935) as modified data.

At step 940, a check is performed to determine if the packet is ready for transfer onto the packet network (e.g., the packet contains enough data to warrant transferring the packet). If not, the sequence returns to step 905. Otherwise, the sequence proceeds to step 945 where the packet is transferred onto the packet network 170. The sequence ends at step 995.

For example, assume a first user at communication unit 105a (FIG. 1) wishes to send a text message to a second user at communication unit 105b. The first user enters the message at his communication unit 105a which converts the entered message to data, places the data into one or more V.110 frames 300 (FIG. 3) and transmits the frames 300 onto the wireless network 110a. The frames 300 are forwarded from the wireless network 110a to the TDM network 150a where they are placed into a channel 220 (FIG. 2) of one or more TDM frames 200.

The TDM frames 200 are eventually received by packet gateway 400a's TDM interface 410 (FIG. 4) which transfers the frames 200 to the gateway's demultiplexor 415. The demultiplexor 415 demultiplexes the frames 200, as described above, into a series of 32 data streams wherein each data stream is associated with a TDM channel. The data streams are fed to the encoder 600 and the detector 500. At the detector 500, the data stream associated with the channel carrying the V.110 frames 300 is fed to the frame detectors 530 (FIG. 5).

Eventually, the frame detector 500 detects a predetermined number of consecutive V.110 frames 300 and notifies the control process 450 of this condition. Specifically, referring to FIGS. 7A-B, the frame detector 500 initializes a frame found counter (not shown) (step 705). The detector 500 buffers bits of the V.110 frame 300 contained in the data stream (step 715) and determines if the bits indicate "a start of a V.110 frame" (step 720). Assuming the bits indicate a "start of a V.110 frame," the detector 500 continues to buffer bits from the data stream until a V.110 frame's worth of bits (i.e., 80 bits) have been buffered (step 725). After a V.110 frame's worth of bits have been buffered (step 730), the detector 500 examines the buffered bits to determine if a valid V.110 frame has been found. Assuming a valid V.110 frame has been found, the detector 500 increments the frame found counter (step 740) and determines if a predetermined number of V.110 frames (e.g., four consecutive V.110 frames) have been found (step 745). Assuming, a predetermined number of V.110 frames have been found, the detector 500 notifies the control process 450 that a predetermined number of V.110 frames have been found in the data flow. In response to this notification, the control process 450 configures the encoder 600 associated with the data stream's channel to enter clear channel mode (step 750). The channel's encoder 600 enters clear channel mode thereby causing data on the data stream to be passed through the encoder 600 as unmodified data, as described above.

Assume the channel associated with the data stream is in clear channel mode. Referring now to FIGS. 6 and 9, at the encoder 600 the V.110 frames 300 in the data stream pass through the selector 602 to the encapsulator 425 via path 608 (step 920). The encapsulator 425 places the V.110 frames 300 into a packet (step 925). When the packet is ready for transfer onto the packet network 170 (step 940) e.g., because the packet is full or a certain period of time has elapsed, the encapsulator 425 transfers the packet to the packet interface 430 which places the packet onto the packet network 170 (step 945).

Referring now to FIG. 8, after the channel associated with the data stream has been placed in clear channel mode, the data detected function 540 fills a "bucket," associated with the channel, with tokens (step 805). As successive valid V.110 frames are detected, tokens are added to the bucket until the bucket is full (steps 820-845).

Now assume that the text message has been sent to the second user and the first user is now having a telephone conversation with the second user. Further assume the channel 220 that was used to carry the V.110 frames is now carrying voice-coded data from the telephone conversation and that the voice-coded data is not carried in V.110 frames. The data stream carrying the voice-coded data is eventually received by the detector 500. Since the voice-coded data is not carried in V.110 frames 300, none of the frame detectors 530 indicate that a valid V.110 frame has been found. Since the information now carried by the channel is not contained in valid V.110 frames (step 820), the data detected function removes a token from the bucket (step 825). This continues until the bucket is empty (step 830). After the bucket is empty, the data detected function 540 indicates to the control process 450 (FIG. 4) that V.110 frames are no longer being detected. In response, the control process 450 exits clear channel mode for the data stream by e.g., configuring the selector 602 to pass the data stream's data to one of the CODECs 604 (step 840).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for processing data frames carried by a Time Division Multiplexing (TDM) channel, the method comprising: detecting if the TDM channel is carrying data frames; determining if a predetermined number of data frames have been carried by the TDM channel; if so, entering a clear channel mode for the TDM channel, wherein the clear channel mode causes data frames carried by the TDM channel to be placed into one or more data packets as unmodified data; determining if the TDM channel is no longer carrying data frames; and if so, exiting the clear channel mode for the TDM channel.

2. A method as defined in claim 1 wherein the data frames conform to the International Telecommunication Union Telecommunication Standardization Sector (ITU-T) V.110 standard.

3. A method as defined in claim 1 wherein the TDM channel is associated with a bucket configured to hold tokens.

4. A method as defined in claim 3 further comprising:
   determining if the TDM channel is not carrying data frames; and
   if so, removing a token from the bucket.

5. A method as defined in claim 3 further comprising:
   determining if the TDM channel is carrying a data frame; and
   if so, adding a token to the bucket.

6. A method as defined in claim 3 further comprising:
   determining if the bucket is empty; and
   if so, exiting the clear channel mode for the TDM channel.

7. A method as defined in claim 3 further comprising:
   filling the bucket with tokens after entering clear channel mode for the TDM channel.

8. A gateway device for processing data frames carried by a Time Division Multiplexing (TDM) channel, the gateway device comprising: a detector configured to determine if the TDM channel is carrying data frames and if a predetermined number of data frames have been carried by the TDM channel; an encoder configured to enter a clear channel mode if the detector has determined the TDM channel is carrying data frames and if a predetermined number of data frames have been carried by the TDM channel, wherein the clear channel mode causes data frames carried by the TDM channel to pass through the encoder without being modified; and an encapsulator configured to place the unmodified data frames passed through the encoder into one or more data packets; the detector further configured to determine if the TDM channel is no longer carrying data frames, and the encoder further configured to exit clear channel mode if the detector has determined the TDM channel is no longer carrying data frames.

9. A gateway device as defined in claim 8 further comprising:
   a bucket associated with the TDM channel that is configured to hold tokens.

10. A gateway device as defined in claim 9 wherein the detector is further configured to:
   (a) determine if the TDM channel is not carrying data frames, and
   (b) if so, remove a token from the bucket.

11. A gateway device as defined in claim 9 wherein the detector is further configured to:
   (a) determine if the TDM channel is carrying a data frame, and
   (b) if so, add a token to the bucket.

12. A gateway device as defined in claim 9 wherein the detector is further configured to:
   (a) determine if the bucket is empty, and
   (b) if so, exit the clear channel mode for the TDM channel.

13. A gateway device as defined in claim 9 wherein the detector is further configured to fill the bucket with tokens after entering clear channel mode for the TDM channel.

14. An apparatus for transferring user data from a Time Division Multiplexing (TDM) network onto a packet network, the apparatus comprising: means for detecting if the TDM channel is carrying data frames and determining if a predetermined number of data frames have been carried by the TDM channel; and means for entering a clear channel mode for the TDM channel if the TDM channel is carrying data frames and if a predetermined number of data frames have been carried by the TDM channel, wherein the clear channel mode causes the data frames to be placed into one or more data packets as unmodified data; means for determining if the TDM channel is no longer carrying data frames; and means for exiting the clear channel mode for the TDM channel if the TDM channel is no longer carrying data frames.

15. A communications network comprising:

a Time Division Multiplexing (TDM) network configured to carry data frames in a TDM channel; a data network configured to carry data packets; and a gateway device coupled to the TDM network and the data network, the gateway device configured to: (a) detect if the TDM channel is carrying data frames and determine if a predetermined number of data frames have been carried by the TDM channel, (b) enter a clear channel mode for the TDM channel in which data frames carried by the TDM channel are placed into one or more data packets, and (c) transfer the one or more data packets onto the packet network, (d) determine if the TDM channel is no longer carrying data frames, and (e) exit the clear channel mode for the TDM channel if the TDM channel is no longer carrying data frames.

* * * * *